(12) United States Patent
Netsch

(10) Patent No.: US 7,087,265 B1
(45) Date of Patent: Aug. 8, 2006

(54) IMAGE DEVELOPING DEVICE

(76) Inventor: Bryan A. Netsch, 444 Remington Pt., Highland Village, TX (US) 75077

( * ) Notice: Subject to any disclaimer, the term of this patent is extended or adjusted under 35 U.S.C. 154(b) by 0 days.

(21) Appl. No.: 10/906,244

(22) Filed: Feb. 10, 2005

(51) Int. Cl.
*B41M 5/20* (2006.01)

(52) U.S. Cl. .......................... 427/145; 101/483; 427/1; 427/150; 427/152

(58) Field of Classification Search .................... None
See application file for complete search history.

(56) References Cited

U.S. PATENT DOCUMENTS

| | | | | |
|---|---|---|---|---|
| 4,321,093 A | * | 3/1982 | Seitz ........................... | 523/161 |
| 4,865,938 A | | 9/1989 | Sakai et al. .................. | 430/138 |
| 4,943,089 A | * | 7/1990 | Reardon ....................... | 283/81 |
| 6,114,281 A | * | 9/2000 | Belding et al. .............. | 503/201 |
| 6,162,485 A | | 12/2000 | Chang .......................... | 427/1 |
| 2003/0236165 A1 | | 12/2003 | Peebles et al. .............. | 503/215 |

* cited by examiner

*Primary Examiner*—Daniel J. Colilla
*Assistant Examiner*—Marissa Ferguson-Samreth
(74) *Attorney, Agent, or Firm*—Luedeka, Neely & Graham, PC

(57) ABSTRACT

The invention relates to a device for developing latent or hidden images. The device includes a first substrate containing a hidden or latent image printed on a first surface thereof, wherein the image contains one or more chromogenic compounds. A second substrate having a first surface contains a developer coating for developing the hidden or latent image. The developer coating includes a developer compound, a micro-encapsulated solvent, and an adhesive. Upon sufficient interfacial contact between the first surfaces of the first and second substrates, a visible image is produced. The device enables production of a relatively vibrant, full color images which are substantially non-toxic and relatively inexpensive to make.

26 Claims, 2 Drawing Sheets

IMAGE DEVELOPING DEVICE

FIELD OF THE DISCLOSURE

The disclosure relates to hidden or latent full color images and to devices containing the images and means capable of developing the images.

BACKGROUND AND SUMMARY

Relatively inexpensive novelty items containing hidden images are produced in large quantities and are used in a variety of applications including game pieces, food packaging prizes, educational children's books and the like. Many of these items contain hidden images. The images may be developed or revealed by applying a liquid or solid developer or solvent to the hidden image area of the object, by removing an opaque coating over the image, by heating the image, by rubbing the image to rupture microcapsules containing color developer or colorant and the like. The disadvantage of many of these items is that the image is often blurry, weakly developed and/or does not contain vibrant well defined colors. Another disadvantage of such objects is that the developer or solvent is often toxic or hazardous and thus could be dangerous when used by unsupervised children or infants.

Color forming dyes which are applied to a substrate in the form of microcapsules have limited application for producing images as the microcapsules are relatively fragile and care must be taken to assure that the microcapsules are applied to the substrate without substantial breakage of the microcapsules. Scuffing the printed surface or exposing the printed surface to heat may prematurely rupture the microcapsules. Thus it is difficult to print latent or hidden images using microcapsules containing the reactive components by four color process techniques. Another disadvantage of microcapsules containing the color former or developer compound is that the developed colors are somewhat diluted by the presence of the microcapsule material and are less vibrant than colors developed in the absence of microcapsules.

In addition to the use of microcapsules, chromogenic compounds have been dispersed in a wax medium and applied to a substrate. The wax medium, however, may dilute or blur the color forming compounds and delay or retard the speed the image develops. As with the microcapsules described above, scuffing or exposing the wax medium to heat may cause premature release of the color forming compounds or developer. Accordingly, there remains a need for cost effect devices and methods for applying color forming compounds to substrates to produce full color images which may be developed using relatively safe image activation techniques.

Considering the foregoing, the disclosure provides a device for developing latent or hidden images includes a first substrate containing a hidden or latent image printed on a first surface thereof, the image containing one or more chromogenic compounds and a second substrate having a first surface containing a developer coating for developing the hidden or latent image. The developer coating contains a developer compound, a micro-encapsulated solvent, and an adhesive.

In another aspect the disclosure provides a method for making a device for developing a latent image or hidden image into a visible image. The method includes printing a latent or hidden image comprising a chromogenic compound on a first surface of a first substrate. A pressure-sensitive adhesive material is applied to a first surface of a second substrate. The material contains a developer compound, a micro-encapsulated solvent which is compatible with the chromogenic compound and developer compound, and an adhesive. Subsequent, interfacial pressure contact between the first surface of the first substrate and the first surface of the second substrate provide development of the latent or hidden image.

An important advantage of embodiments of the disclosure is that devices containing the hidden or latent images may be developed readily without the use of liquid developer compounds which may leak, stain, dry or which may contain toxic or harmful components. Another advantage is that black and white or full color images may be developed which have excellent resolution and/or possess vibrant colors. Still another advantage of embodiments of the disclosure is that the developed images are substantially permanent and cannot be readily altered or modified thereby improving the security of the developed images. Since a protective, substantially transparent film is used to apply the developer to the hidden image, there are no liquid developer pens or wax markers that come in contact with the image to smear the image. Hence, the hidden or latent image may be printed on a wider variety of substrates, including less porous substrates, films, and the like while conventional developer pens and wax markers are typically limited to use on porous substrates.

BRIEF DESCRIPTION OF THE DRAWINGS

Further features and advantages of embodiments of the disclosure will become apparent by reference to the detailed description when considered in conjunction with the figures, which are not to scale, wherein like reference numbers indicate like elements through the several views, and wherein.

DETAILED DESCRIPTION OF THE PREFERRED EMBODIMENTS

In the device and methods described herein, a latent or hidden image is printed on a first surface of a first substrate and a layer containing a developer compound is contained on a first surface of a second substrate. The latent or hidden image printed on the first surface is preferably substantially invisible to the unaided eye. The terminology "substantially invisible" means that the deposited area may have a slight discoloration which may vary in tint from the adjacent substrate, however, to the casual observer, the variation in tint or coloration is so slight as to be essentially imperceptible prior to developing the image. In the alternative, a latent or hidden image may be included in a visibly outlined area on the first substrate such that the interior areas of the outlined area contain the image to be developed.

Figure 1:
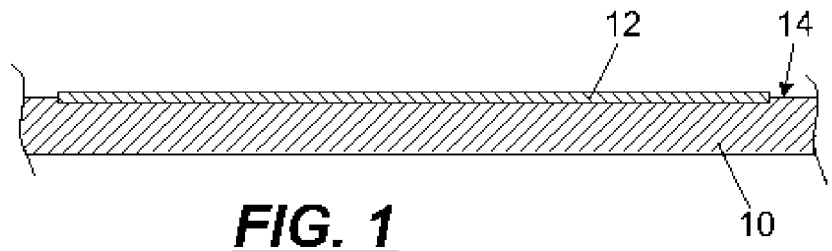
FIG. 1 is a cross-sectional view, not to scale, of a first substrate containing a latent or hidden image printed thereon.

With reference to FIG. 1, a first substrate 10 is provided which contains a latent or hidden image 12 printed on a first surface 14 thereof. The image 12 is preferably derived from a chromogenic containing ink composition. The substrate 10 may be selected from a wide variety of materials including glass, ceramic, porous materials such as natural or synthetic paper and substantially transparent polymeric films such as films made from polyethylene, polypropylene, polyvinyl chloride, polystyrene, polyester, polybutylene and the like. In order to reduce penetration of the image 12 into the first substrate, in the case of a porous substrate such as paper, an underprint layer or filler may be used to modify at least the surface 14 of the first substrate to maintain the image 12 adjacent the first surface 14.

When a substantially transparent film is used as the first substrate 10, the film preferably contains an ink absorbing layer such as described in U.S. Pat. No. 4,379,804 to Eisele et al.; U.S. Pat. No. 4,935,307 to Igbal et al.; U.S. Pat. No. 4,956,230 to Edwards et al.; U.S. Pat. No. 5,118,570 to Malhotra and U.S. Pat. No. 5,219,928 to Stofko et al., the disclosures of which are incorporated herein by reference as if fully set forth herein.

The chromogenic ink composition used to provide the image 12 on the first substrate 10 may include one or more chromogenic compounds selected from the group consisting of crystal violet lactone, Michler's hydrol, fluoran compounds, leuco compounds, auramine compounds, bis-indolylphthalide compounds and combinations of two or more of the foregoing. It is preferred to use a substantially colorless chromogenic compound for inclusion in the chromogenic ink composition so that the printed image 12 is substantially invisible. Suitable chromogenic compounds include but are not limited to CIBA 12G (blue), CIBA 16B (red), CIBA IG (orange) and other color forming dyes available under the trade name PERGASCRIPT from Ciba Specialty Chemicals of Tarrytown, N.Y.

The amount of chromogenic compound in the ink composition may range from about 0.5 to about 10 percent based on the total weight of the ink composition. The image 12 may be printed on the substrate 10 by a wide variety of printing techniques including, but not limited to, flexographic, lithographic, sheet fed, web offset, roto gravure, gravure, screen printing and variable image printing techniques. Accordingly, the ink composition may include a solvent-based or aqueous-based ink base suitable for use in any of the foregoing printing processes. It is particularly preferred that the ink compositions be substantially colorless and adaptable to four color processing operations.

A solvent based ink base may include one or more of the foregoing dyes or color forming compounds, and one or more of a polyamide resin, ethanol, heptane, n-propyl acetate, isopropyl alcohol, n-propanol, and nitrocellulose. Such ink compositions may contain from about 10 to about 45 percent by weight polyamide resin, from about 10 to about 45 percent by weight ethanol, from about 5 to about 15 percent by weight heptane, and from about 0.5 to about 10 percent by weight of one or more of the other components. Such ink compositions are available from Flint Ink of Ann Arbor, Mich. under the trade name POLY GLOSS ACTIVATOR.

The chromogenic compound may be dissolved in an ink base or may be suspended in the ink base as finely divided particles. In either case, it may be beneficial to provide as small of chromogenic particles as possible to aid in dissolution or suspension of the particles in the ink base and to reduce the amount of chromogenic compound needed to provide vibrant colors upon developing the image 12.

After printing the latent or hidden image 12 on the first surface 14 of the first substrate 10, the image 12 is dried or cured so that the binder in the ink base and chromogenic compound are fixedly adhered to the first substrate surface. The term "fixedly adhered" means that the printed first surface 14 of the first substrate 10 is substantially dry to the touch and the printed image 12 is not readily removed from the surface 14 by touching or handling the printed first surface 14 of the substrates for assembly, packaging, or shipping. The image may be dried or cured by heat and/or air, UV, microwave or electron beam radiation and the like. The printed area forming the image 12 on the first surface 14 may be outlined with a visible ink if desired to show the location of the latent or hidden image.

Figure 2:
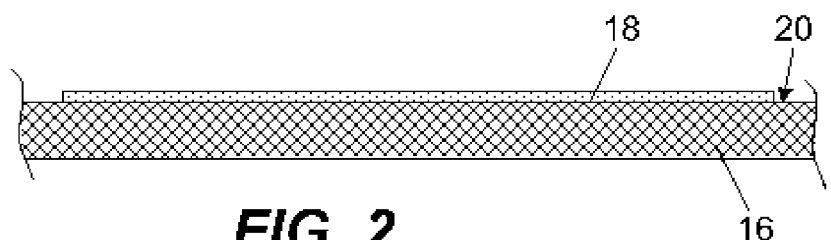
FIG. 2 is cross-sectional views, not to scale, of a second substrates containing a developer coating applied thereto.

FIG. 2 illustrates construction of a second substrate 16 containing an image developing layer such as color developer layer 18 on a surface 20 thereof. Like the first substrate 10, the second substrate 16 may be selected from glass, ceramic, porous materials such as natural or synthetic paper and substantially transparent polymeric films such as films made from polyethylene, polypropylene, polyvinyl chloride, polystyrene, polyester, polybutylene and the like, provided at least one of the first or second substrates is a substantially transparent polymeric film.

Substantially transparent films useful as the first substrate 10 or second substrate 16 preferably have a thickness that may range from about 10 to about 100 microns. Particularly preferred films are substantially optically clear, about 50 micron thick, and are print receptive films. Such films include, but are not limited to, polyethylene terephthalate (PET) films available from Mitsubishi Polyester Film LLC of Greer, S.C., under the trade name HOSTAPHAN 4400 and from SKC, Inc. of Covington, Ga. under the trade name SH-81.

The length and width of the transparent film is not critical to the invention and may be any suitable length and width. The film may also be cut into selected shapes for application to the first substrate. The terms "substantially transparent" and "substantially optically clear" mean that details of objects or images covered by such a film are essentially visible through the film as opposed to blocking all or a substantial portion of the object or image from view.

For the purpose of illustration only, the invention will now be described with the latent or hidden image 12 being printed on an opaque substrate 10 and the developer layer 18 being coated onto a substantially transparent substrate 16. It will be recognized by those of ordinary skill in the art that the latent or hidden image 12 may be printed on the substantially transparent substrate 16 and the developer layer may be included on an opaque substrate 10 or on another substantially transparent substrate.

The color developer compound in the developer layer 18 may be selected from acidic clays and unsubstituted or ring-substituted phenols, phenolic resins, sulfone compounds, alkylhydroxybenzoic acid compounds and salicylic acid or salicylate and their metal salts or combinations of two or more of the foregoing. Accordingly, a preferred color developer compound may be a benzoic acid, 2-hydroxy-3,5-bis(1-phenylethyl)-, zinc salt and (9,10-dihydro-9-oxa-10-phosphophenanthrene-10-oxide) copolymer with $\alpha$-methylstyrene, styrene, and polyvinylalcohol, such as a resin available from Sanko Co. Ltd, of Osaka-fu, Japan under the trade name USR-054 and/or a combination of the foregoing resin and an aqueous zinc salicylate type resin available from Schenectady International, Inc. of Schenectady, N.Y., under the trade name HRJ-14508. While zinc is the preferred cation, other metal cations may also be used, such as cadmium (III), zirconium (II), cobalt (II), strontium (II), aluminum (III), copper (III), and tin (II). The color developer compound is present on the second substrate as fine particles substantially dispersed in other components of layer 18. Layer 18 may include from about 10 to about 60 percent by dry weight of the color developer compound.

The layer 18 also includes a micro-encapsulated organic solvent which may be selected from compounds such as alcohols, dioctylphthalate (DOP), di-isooctylphthalate (DIOP), isopropyl myristate (IPM), isopropyl palmitate (IPP), soybean oil (unepoxidized), castor oil, linseed oil, olive oil, mineral oil, petrolatum (otherwise known as petroleum jelly or paraffin jelly) and the like or mixtures thereof. The solvent is preferably compatible with the chromogenic compound and the developer compound. A preferred micro-encapsulated solvent is available from Schenectady International, Inc. under the trade name HRJ-15151. The layer 18 may include from about 20 to about 50 percent by weight of the micro-encapsulated solvent based on the dry weight of micro-encapsulated solvent in the layer 18.

It is preferred that microcapsules for the micro-encapsulated solvent have relatively thin walls so that rupture of the microcapsules to release the solvent may be readily achieved. However, the walls of the microcapsules should not be so thin that it is difficult to coat the layer 18 on a substrate surface without rupturing a substantial portion of the microcapsules. Also, it is desirable that premature rupture of the micro-capsules not occur when handling the second substrate 16. Accordingly, a preferred microcapsule wall content may range from about 5 to about 10 percent by weight of the total weight of the microcapsule and solvent. The term "wall content" means the weight percentage of the microcapsule that is provided by the walls containing the solvent.

The wall thickness of the microcapsules for a particular wall content may vary according to the size or diameter of the microcapsules. Typically, the micro-capsules have a diameter ranging from about 5 to about 10 microns. It is also preferred that the micro-encapsulated solvent be readily dispersible in an aqueous fluid for mixing with the developer compound described above and an adhesive, as described below.

Another component of layer 18 is an adhesive for retaining the developer compound and micro-encapsulated solvent on the second substrate 16. A preferred adhesive for use as the continuous phase of layer 18 is a pressure sensitive adhesive which enables substrates 16 and 10 to be fixedly attached to one another during the image developing step. A preferred pressure sensitive adhesive is an aqueous-based adhesive such as an adhesive available from Dyna-Tech Adhesives of Grafton, W. Va. under the trade name TECH-CRYL 6136. The amount of pressure sensitive adhesive in layer 18 may range from about 20 to about 60% by weight of the total dry weight of layer 18.

Other minor components used to provide layer 18 include, but are not limited to an anti-foam agent and a filler such as hydrophobic silica. The amount of the other components is typically less than about 0.5 weight percent of a formulation containing the adhesive and microencapsulated solvent components.

Figure 3:
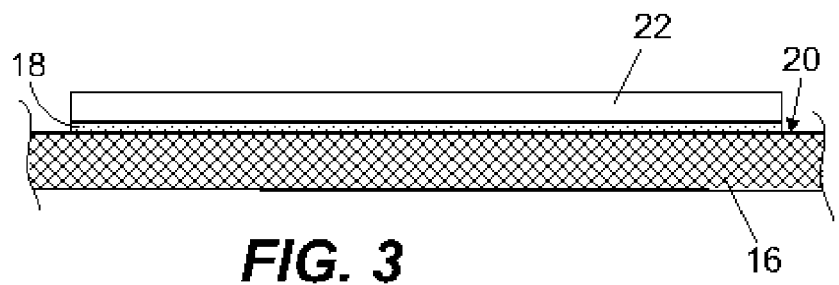
FIG. 3 is a cross-sectional view, not to scale, of a second substrate composite material.

In order to protect layer 18 containing an adhesive, the developer compound, and the micro-encapsulated solvent for the chromogenic compounds and developer compound, a cover web or release liner 22 as illustrated in FIG. 3 is removably attached to layer 18. The release liner 22 preferably includes a substrate made from natural or synthetic paper that is coated to contain a non-sticking surface on the side of the release liner 22 adjacent layer 18. The non-stick coating may be selected from silicone-containing polymers, waxes, various derivative compounds of polyvinyl alcohols and polyvinyl ethers of alkyl alcohols. The coating should be sufficient to enable the liner 22 to be readily removed from layer 18 without significantly affecting the integrity of layer 18. A suitable release liner is a bleached polycoated paper available from Loparex, Inc. of Willowbrook, Ill. having a thickness of about 165 microns. During manufacture, layer 18 may be applied to the surface 20 of the second substrate or to the release liner 22 for transfer to the surface 20 of the second substrate 18.

Figure 4A:
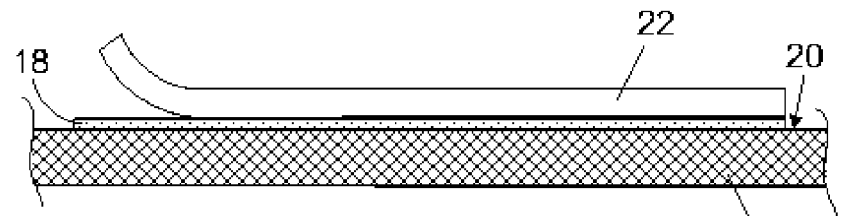
FIGS. 4A–4C illustrate steps in a method for developing a latent or hidden image.
Figure 4B:
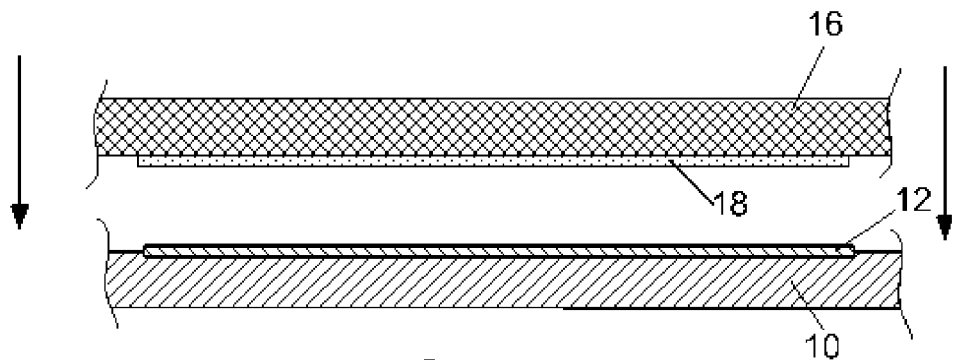
Figure 4C:
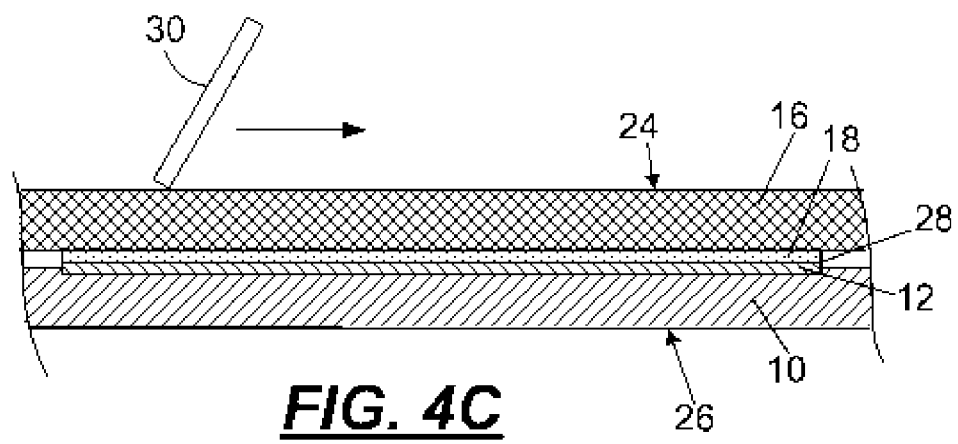

A process for developing a latent or hidden image is shown in the sequence of FIGS. 4A–4C. In order to prepare substrate 16 for attachment to substrate 10, release liner 22 is peeled away or otherwise detached from layer 18 containing the developer compound, micro-encapsulated solvent, and adhesive. Next, substrates 16 and 10 are placed closely adjacent one another so that layer 18 is opposite the hidden or latent image 12 printed on substrate 10. The substrates 16 and 10 are pressed together to promote substantial interfacial contact at an interface location 28 between the image 12 and the layer 18.

In order to rupture at least a portion of the microcapsules and release sufficient solvent to interact with the developer compound and image 12, a second surface 24 of the second substrate or a second surface 26 of the first substrate may be rubbed with a fingernail, coin, or other substantially rigid object 30 that is capable of rupturing the microcapsules in layer 18. As the surface 24 or 26 is rubbed, microcapsules containing the solvent are ruptured providing an amount of solvent suitable for causing reaction between the chromogenic compound in image 12 and the developer compound in layer 18. However, because the solvent is contained in microcapsules that are attached to layer 18, there is no liquid solvent or developer to spill or otherwise come in contact with a user's hands or clothing.

Figure 5:
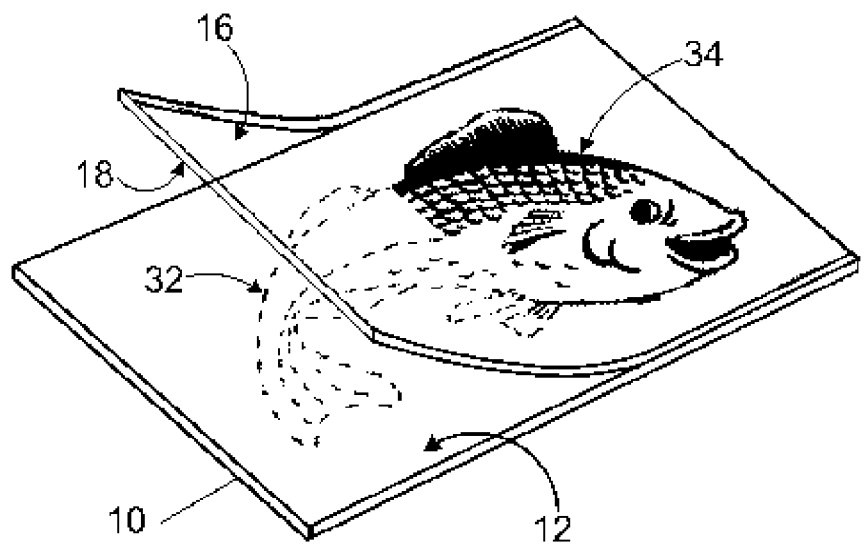
FIG. 5 is a perspective view of a partially developed image using an image developing device according to an embodiment of the disclosure.

The progress of image development as substrate 16 is attached to substrate 10 is illustrated by reference to FIG. 5. The broken lines on substrate 10 represent a hidden or latent image 32. After removal of the release liner 22 (FIG. 4A), substrate 16 is placed against substrate 10 as shown beginning at point A (FIG. 5). As the layer 18 comes into contact with the image 32, and the second surface 24 of the substrate 16 is rubbed, at least a portion of the microcapsules are ruptured, thereby releasing solvent. The solvent enables reaction between the chromogenic compounds in latent image 32 and the developer compound in layer 18 thereby producing a visible image 34 having vibrant colors. As a consequence of use of a pressure sensitive adhesive either in layer 18 or adjacent layer 18, substrate 16 may be fixedly attached to substrate 10 producing a substantially permanent visible image 34.

In an alternative embodiment, the first surface 14 of substrate 10 may include a pressure sensitive adhesive in addition to the latent image 12. In such an embodiment, layer 18 on substrate 16 may be provided by dispersing the developer compound and micro-encapsulated solvent in a suitable aqueous binder. Contact between substrate 10 and substrate 16 and rupture of the microcapsules to release solvent and develop the image is generally in accordance with the method described above.

In yet another alternative embodiment, the first surface 14 of substrate 10 may include the micro-encapsulated solvent, described above, in addition to the latent image 12. In such an embodiment, layer 18 on substrate 16 may be provided by dispersing the developer compound in the pressure sensitive adhesive that is applied to substrate 16. Contact between substrate 10 and substrate 16 and rupture of the microcapsules to release solvent and develop the image is generally in accordance with the method described above.

While the embodiments have been described in detail, it is to be expressly understood that various changes of form, design or arrangement may be made to the disclosed embodiments by those skilled in the relevant art without departing from the spirit and scope of the thereof. Therefore, the above mentioned description is to be considered exemplary, rather than limiting, and the scope of the disclosure is defined by the following claims.

What is claimed is:

1. A device for developing latent or hidden images comprising:
   a first substrate containing a hidden or latent image printed on a first surface thereof, the image containing one or more chromogenic compounds,
   a second substrate having a first surface containing a developer coating for developing the hidden or latent image, wherein the developer coating contains a developer compound,
   a micro-encapsulated solvent substantially devoid of chromogenic compounds and developer compound is applied to at least one of the first surface of the first substrate and the first surface of the second substrate, and
   an adhesive applied to at least one of the first surface of the first substrate and the first surface of the second substrate.

2. The device of claim 1, wherein the first substrate comprises a porous substrate.

3. The device of claim 2, wherein the first substrate comprises natural or synthetic paper.

4. The device of claim 1, wherein the adhesive is an aqueous-based pressure sensitive adhesive.

5. The device of claim 1, wherein the second substrate comprises a substantially transparent polymeric film selected from the group consisting of polyethylene, polypropylene, polyvinyl chloride, polystyrene and polyester.

6. The device of claim 5, wherein the polymeric film contains a pressure sensitive adhesive, the color developer compound, and the micro-encapsulated solvent coated onto the first surface of the polymeric film to provide a coated surface.

7. The device of claim 6, wherein the second substrate further comprises a release liner releasably attached to the coated surface the polymeric film.

8. The device of claim 1, wherein the first substrate comprises a substantially transparent polymeric film selected from the group consisting of polyethylene, polypropylene, polystyrene, polyvinyl chloride and polyester, the film containing the one or more chromogenic compounds printed thereon.

9. The device of claim 8, wherein the second substrate comprises a substantially opaque second substrate containing a pressure sensitive adhesive, the color developer compound, and the micro-encapsulated solvent coated onto the first surface of the opaque second substrate to provide a coated surface.

10. The device of claim 1, wherein the chromogenic compound comprises a compound selected from the group consisting of crystal violet lactone, Michler's hydrol, fluoran compounds, leuco compounds, auramine compounds, bis-indolylphthalide compounds and combinations of two or more of the foregoing.

11. The device of claim 10, wherein the chromogenic compound further comprises an ink base selected from the group consisting of flexographic, lithographic, sheet fed, web offset, roto gravure, screen printing, and variable image printing ink bases.

12. The device of claim 10, wherein the amount of chromogenic compound in the ink base ranges from about 0.5 to about 10 percent by weight dry basis.

13. The device of claim 1, wherein the developer compound is selected from the group consisting acidic clays, unsubstituted phenols, ring-substituted phenols, phenolic resins, sulfone compounds, alkylhydroxybenzoic acid compounds, salicylic acid metal salts, salicylic acid, salicylates and their metal salts, and combinations of two or more of the foregoing.

14. The device of claim 13, wherein the developer compound comprises a zinc salt of hydroxy benzoic acid.

15. The device of claim 14, wherein the second substrate comprises from about 10 to about 60 percent by weight dry basis developer compound, from about 20 to about 45 percent by weight dry basis of the micro-encapsulated solvent, from about 20 to about 60 percent by weight dry basis of a pressure sensitive adhesive.

16. The device of claim 15, wherein the second substrate further comprises a release liner releasably attached to the pressure sensitive adhesive.

17. A method for making a device for developing a latent image or hidden image into a visible image, comprising the steps of:
   printing a latent or hidden image comprising a chromogenic compound on a first surface of a first substrate, and
   applying a pressure-sensitive adhesive material to a first surface of a second substrate, the material containing a developer compound, a micro-encapsulated solvent which is compatible with the chromogenic compound and developer compound, and an adhesive, whereby interfacial pressure contact between the first surface of the first substrate and the first surface of the second substrate provide development of the latent or hidden image.

18. The method of claim 17, wherein the second substrate comprises a substantially transparent polymeric film selected from the group consisting of polyethylene, polystyrene, polypropylene, polyvinyl chloride and polyester films.

19. The method of claim 18, wherein the adhesive, the micro-encapsulated solvent, and the developer compound are mixed together as a substantially aqueous dispersion and are applied to a release liner that is used to apply the material to the second substrate.

20. The method of claim 19, wherein the material on the second substrate comprises from about 10 to about 60 percent by weight dry basis developer compound, from about 20 to about 45 percent by weight dry basis micro-encapsulated solvent, and from about 20 to about 60 percent by weight dry basis of pressure sensitive adhesive.

21. The method of claim 17, wherein the developer compound is selected from the group consisting acidic clays, unsubstituted phenols, ring-substituted phenols, phenolic resins, sulfone compounds, alkylhydroxybenzoic acid compounds, salicylic acid metal salts, salicylic acid, salicylates and their metal salts, and combinations of two or more of the foregoing.

22. The method of claim 17, wherein the chromogenic compound comprises a compound selected from the group consisting of crystal violet lactone, Michler's hydrol, fluoran compounds, leuco compounds, auramine compounds, bis-indolylphthalide compounds and combinations of two or more of the foregoing.

23. The method of claim 17, wherein the first substrate comprises a porous substrate selected from natural or synthetic papers.

24. The method of claim 17, wherein the first substrate comprises a substantially transparent polymeric film selected from the group consisting of polyethylene, polypropylene, polystyrene, polyvinyl chloride and polyester, the film containing the chromogenic compound printed thereon.

25. The method of claim 24, wherein the second substrate comprises a substantially opaque substrate.

26. The method of claim 17, wherein the chromogenic compound comprises a flexographic or lithographic ink base containing from about 0.5 to about 10 percent by weight dry basis chromogenic compound.

* * * * *